(12) United States Patent
Hans et al.

(10) Patent No.: US 8,520,525 B2
(45) Date of Patent: Aug. 27, 2013

(54) METHOD OF TRANSMITTING DATA AND COMMUNICATION DEVICE

(75) Inventors: Martin Hans, Bad Salzdetfurth (DE); Hyung-Nam Choi, Hamburg (DE); Dan Dinescu, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 368 days.

(21) Appl. No.: 12/812,752

(22) PCT Filed: Feb. 14, 2008

(86) PCT No.: PCT/EP2008/051799
§ 371 (c)(1),
(2), (4) Date: Jul. 14, 2010

(87) PCT Pub. No.: WO2009/100764
PCT Pub. Date: Aug. 20, 2009

(65) Prior Publication Data
US 2011/0051643 A1    Mar. 3, 2011

(51) Int. Cl.
*H04L 12/28*    (2006.01)

(52) U.S. Cl.
USPC ......... 370/236; 370/235; 370/395.4; 370/468

(58) Field of Classification Search
None
See application file for complete search history.

(56) References Cited

U.S. PATENT DOCUMENTS

| | | | |
|---|---|---|---|
| 5,535,207 A | 7/1996 | Dupont | |
| 6,529,520 B1 * | 3/2003 | Lee et al. | 370/442 |
| 6,950,420 B2 | 9/2005 | Sarkkinen et al. | |
| 7,187,665 B2 * | 3/2007 | Nakamura | 370/329 |
| 2004/0190467 A1 | 9/2004 | Liu et al. | |
| 2007/0111746 A1 * | 5/2007 | Anderson | 455/522 |
| 2007/0133475 A1 | 6/2007 | Peisa et al. | |
| 2009/0154481 A1 * | 6/2009 | Han et al. | 370/406 |
| 2010/0098006 A1 * | 4/2010 | Golitschek Edler Von Elbwart et al. | 370/329 |

FOREIGN PATENT DOCUMENTS

| | | |
|---|---|---|
| EP | 1592272 A2 | 11/2005 |
| EP | 1594246 A2 | 11/2005 |
| WO | 2006059830 A1 | 6/2006 |

OTHER PUBLICATIONS

The International Preliminary Report on Patentability of PCT/EP2008/051799 dated Aug. 26, 2010.
International Search Report of PCT/EP2008/051799.
Dajie Jiang et al.:"Principle and Performance of Semi-Persistent Scheduling vor VoIP in LTE System", Wireless Communications, Networking and Mobile Computing, Wicom 2007, International Conference on, IEEE, Piscataway, NJ, USA, Sep. 2007, pp. 2861-2864.

(Continued)

*Primary Examiner* — Donald Mills

(57) ABSTRACT

A method of transmitting data is described comprising selecting a transmission mode from at least a first and a second transmission mode, wherein according to the first transmission mode data is transmitted in at least two first time periods using first communication resources wherein the at least two first time periods are separated by a first time interval, wherein according to the second transmission mode data is transmitted in at least two second time periods using second communication resources wherein the at least two second time periods are separated by a second time interval, and wherein the first time interval is longer than the second and the first communication resources allow the transmission of a higher amount of data than the second communication resources; and transmitting data according to the selected transmission mode.

17 Claims, 5 Drawing Sheets

(56) References Cited

OTHER PUBLICATIONS

Catt: "VoIP scheduling procedure", 3GPP TSG-RAN-WG2 Meeting #60Bis, R2-080122, No. 60, Jan. 14, 2008; pp. 1-3.
Research in Motion Limited: "Large IP packet delivery during VoIP sessions", 3GPP TSG-RAN-WG2 Meeting #60Bis, R2-080062, Jan. 14, 2001; pp. 1-3.
Research in Motion Limited: Various issues regarding SR channel handling (UL semi-persistent scheduling request, DRX . . . ); 3GPP TSG-RAN-WG2 Meeting #61m R2-080811, R2-080811, vol. No. 61, Feb. 11, 2008, pp. 1-2.
Colin Perkins, "RTP Audio and Video for the Internet", Addison-Wesley, 2003, ISBN 0-672-32249-8, pp. 1-4.
Schulzrinne et al., IETF RFC 3550 RTP:"A Transport Protocol for Real-Time Applications", Jul. 2003, pp. 1-105.
J. Postel, IETF RFC 0768: "User Datagram Protocol", Aug. 28, 1980, pp. 1-4.
3GPP TS 36.213, V8.2.0.:"Evolved Universal Terrestrial Radio Access (E-UTRA), Physical layer procedures, Release 8", Mar. 2008, pp. 1-30.
3GPP TS 26.071, V7.0.1.:"Mandatory Speech CODEC Speech Processing Functions; AMR Speech CODEC; General Description, Release 7", Jul. 2007, pp. 1-12.
3GPP TS 36.300, V8.2.0.:"Evolved Universal Terrestrial Radio Access (E-UTRA) and Evolved Universal Terrestrial Radio Access Network (E-UTRAN), Overall Description, Stage 2, Release 8", Sep. 2007, pp. 1-109.

* cited by examiner

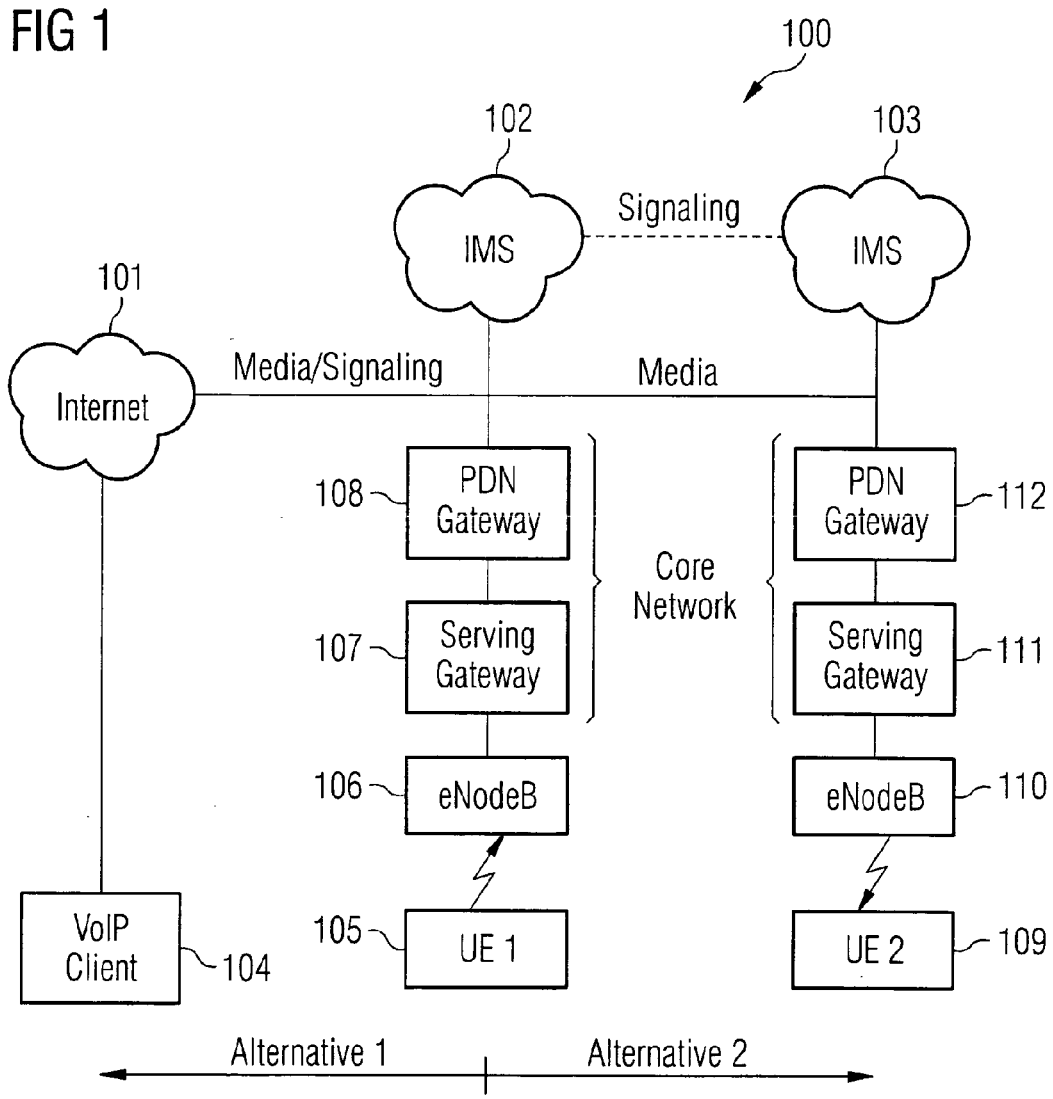

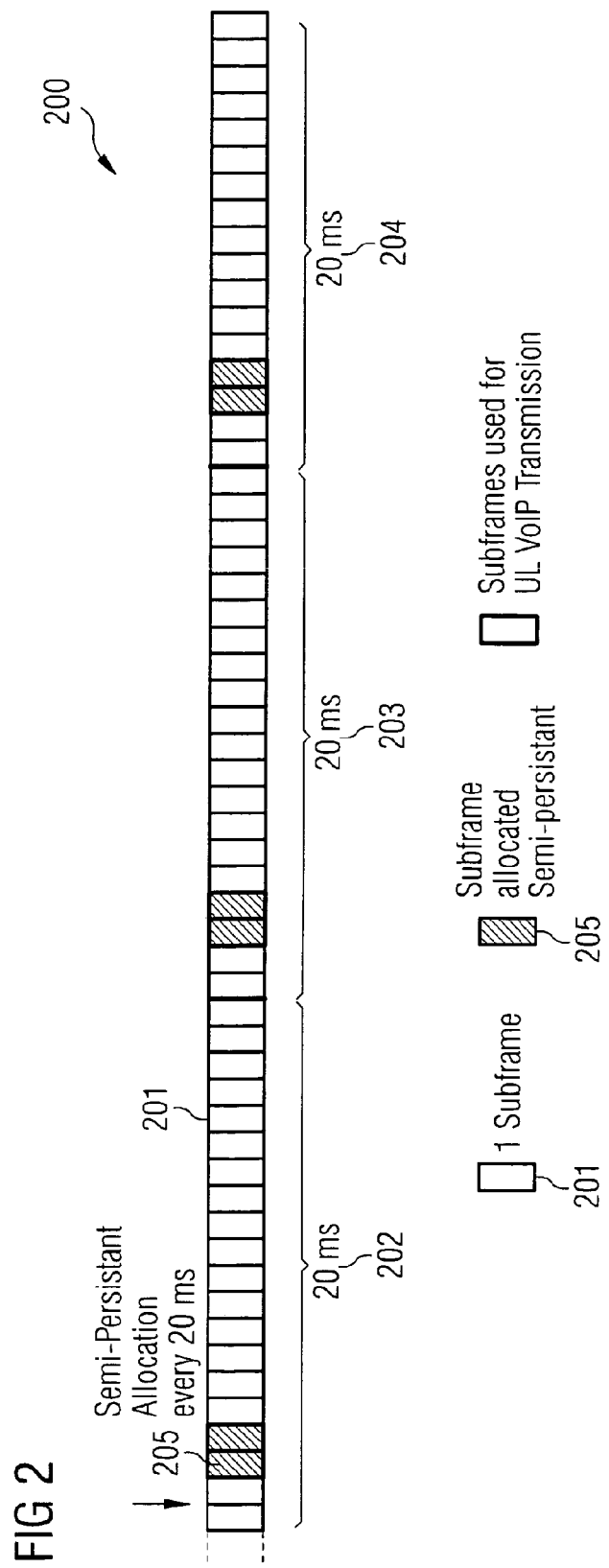

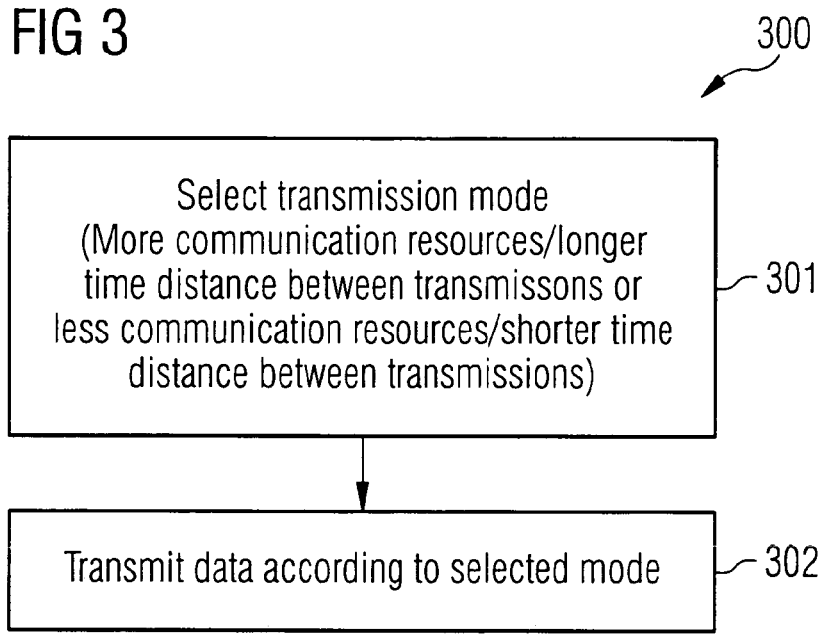
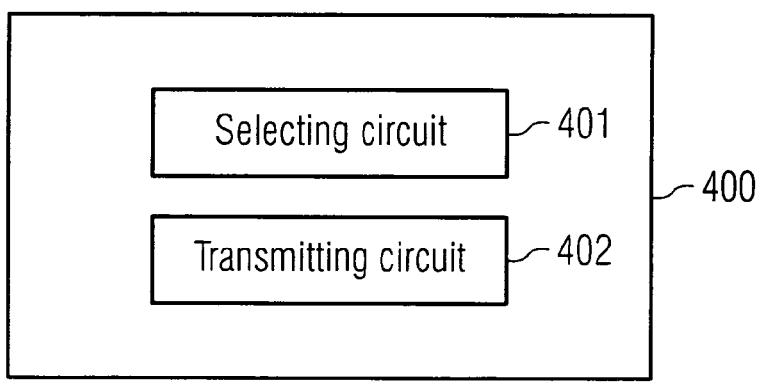

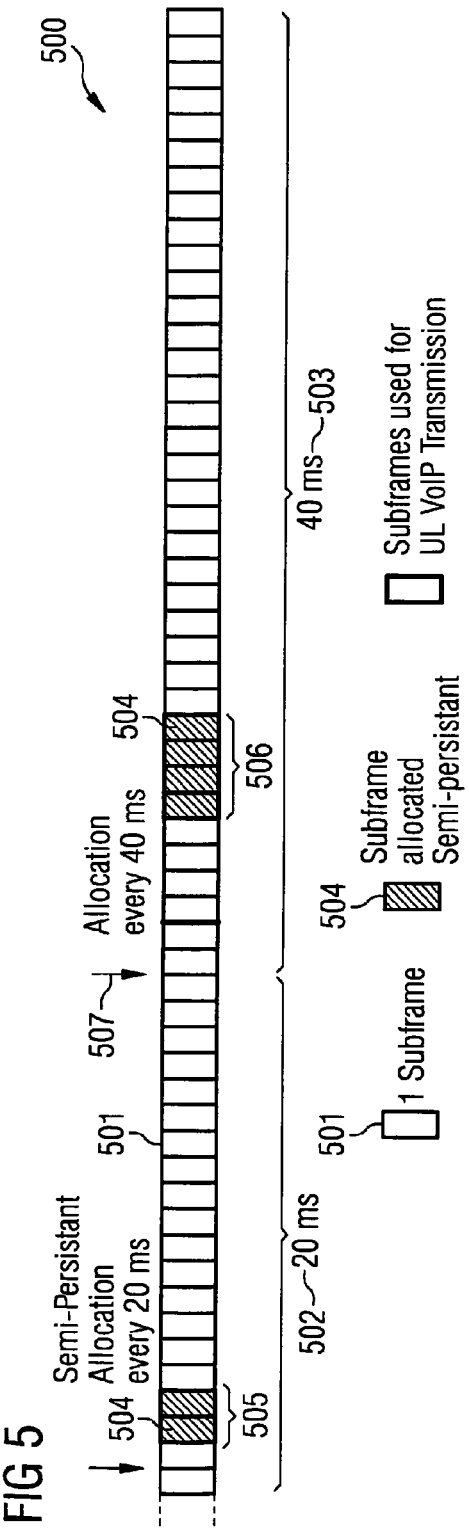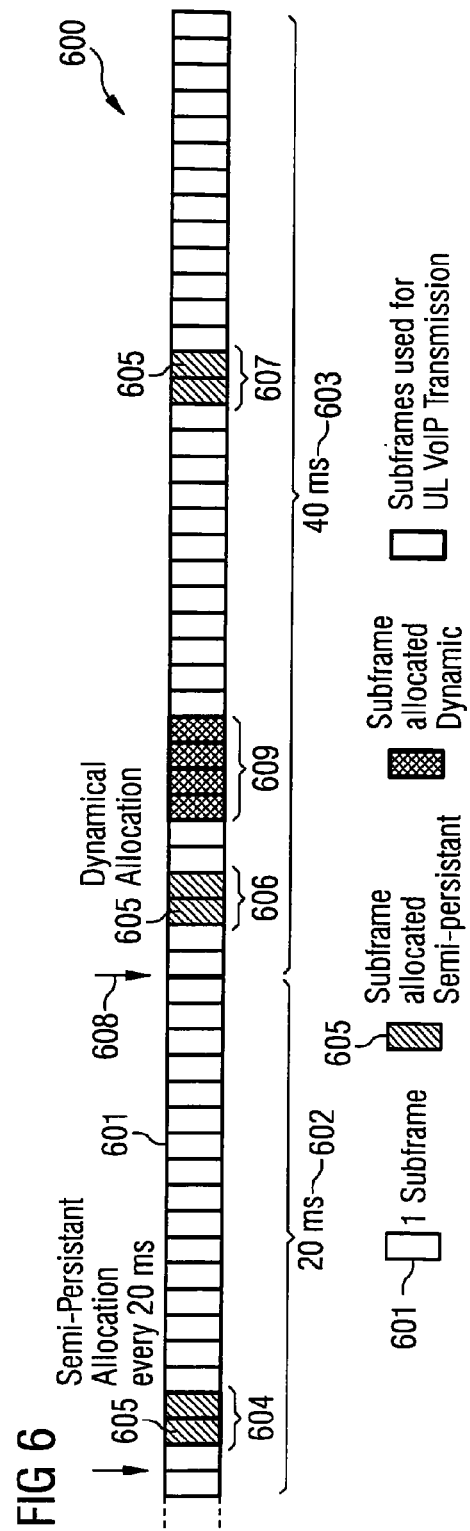

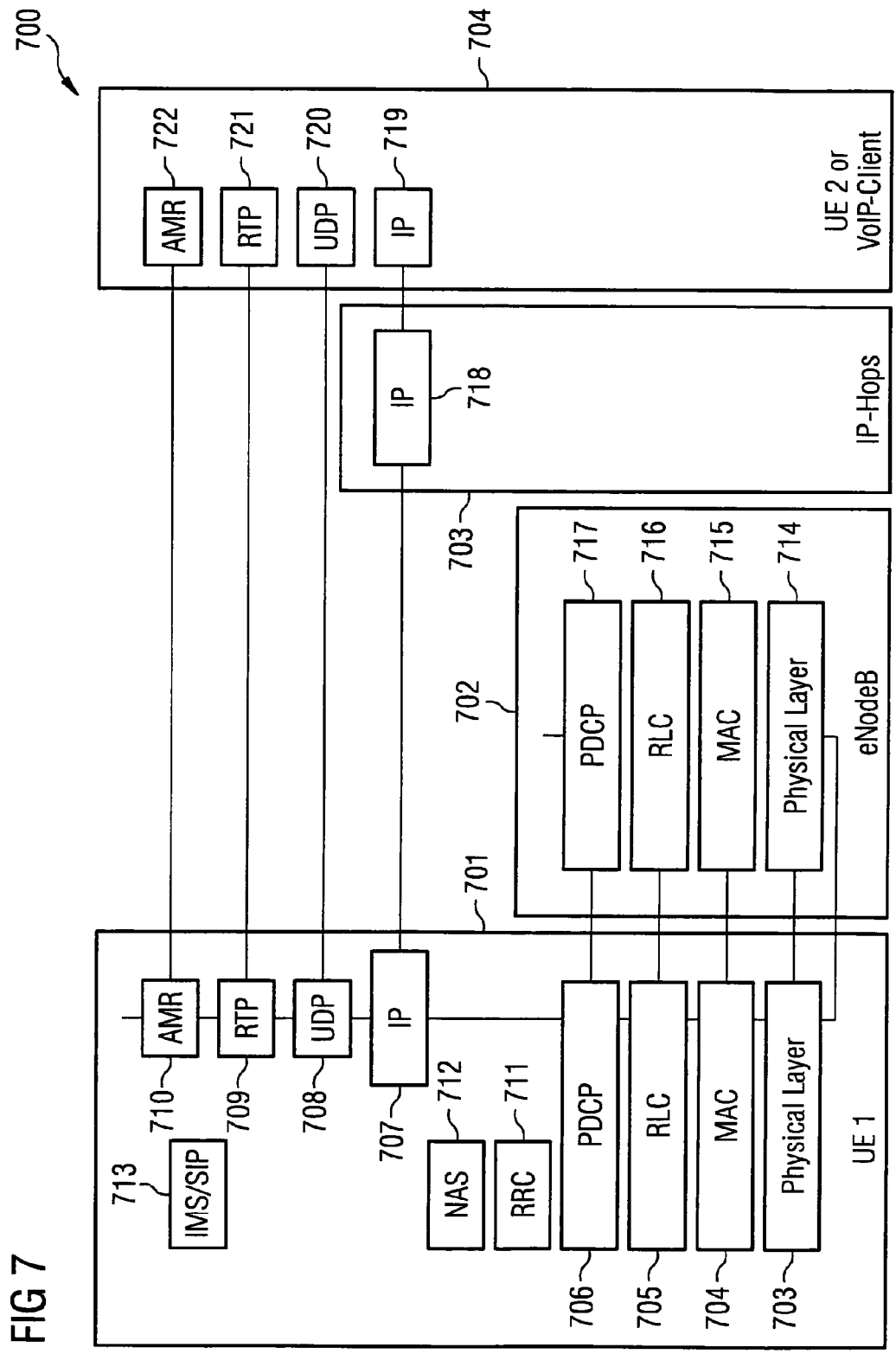

METHOD OF TRANSMITTING DATA AND COMMUNICATION DEVICE

RELATED APPLICATIONS

The present application is a national stage entry according to 35 U.S.C. §371 of PCT application No.: PCT/EP2008/051799 filed on Feb. 14, 2008.

TECHNICAL FIELD

Embodiments relate generally to a method of transmitting data and a communication device.

BACKGROUND

For mobile communication devices it is desirable that the power consumption necessary for the transmission of data is kept low such that the time until, for example, a battery has to be recharged or has to be replaced is as long as possible. Therefore, methods for transmitting data which allow saving power without reducing the quality of the data transmission to an unacceptable level are desired.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a communication system according to an embodiment;

FIG. 2 shows a sub-frame diagram according to an embodiment;

FIG. 3 shows a flow diagram according to an embodiment;

FIG. 4 shows a communication device;

FIG. 5 shows a sub-frame diagram according to an embodiment;

FIG. 6 shows a sub-frame diagram according to an embodiment; and

FIG. 7 shows a communication arrangement from the view of the protocol stack according to an embodiment.

DESCRIPTION

FIG. 1 shows a communication system 100 according to an embodiment.

The communication system 100 may include the Internet 101, a first IMS (Internet protocol multimedia sub-system) sub-network 102 and a second IMS sub-network 103 which are for example part of an IMS network and between which signalling data may be exchanged.

A voice over IP (VoIP) client 104 is coupled to the Internet 101. A first mobile terminal 105 is coupled via a first base station 106, a first serving gateway 107 and a first PDN (packet data network) gateway 108 to the Internet 101 and to the first IMS sub-network 102. Analogously, a second mobile terminal 109 is coupled via a second base station 110, a second serving gateway 111 and a second PDN gateway 112 to the second IMS sub-network 103 and to the Internet 101.

The first serving gateway 107 and the first PDN gateway 108 are for example part of the core network of a communication system. Similarly, the second serving gateway 111 and the second PDN gateway 112 are for example part of the core network of the same mobile communication system or another mobile communication system. The first base station 106 and the second base station 110 are part of the radio access network of the respective mobile communication system. The mobile communication system(s) is/are for example formed according to UMTS (universal mobile telecommunications system), GSM (global system for mobile communications), CDMA2000 (CDMA: code division multiple access), according to LTE (long term evolution) or according to FOMA (freedom of mobile access). In this example, there is only one mobile communication system, i.e. the first mobile terminal 105 and the second mobile terminal 109 are user terminals of the same mobile communication system, which is in this example a mobile communication system according to LTE (long term evolution). Accordingly, the mobile terminals 105, 109 may also be referred to as user equipments (UEs) and the base stations 106, 110 may be referred to as eNodeB (evolved NodeB). A first PDN gateway 108 and the second PDN gateway 112 may exchange media data, for example speech data or video data. Further, the PDN gateways 108, 112 may exchange media data with the Internet 101. The Internet 101 may exchange signalling data with the IMS sub-networks 102, 103. Using this architecture, the mobile terminals 105, 109 and the VoIP client 104 may communicate with each other, for example using the VoIP communication service. When the first mobile terminal 105 and the second mobile terminal 109 communicate, media data is exchanged via the first PDN gateway 108 and the second PDN gateway 112 and the signalling data is exchanged between the first IMS sub-network 112 and the second IMS sub network 103. This means that in one embodiment the IMS sub-networks 102, 103 are used for the exchange of signalling data but not for the exchange of media data.

The voice over IP communication service is used in the following as an example for a real time communication service. In an example, voice over IP is a real time audio communication service for packet data networks, i.e. provided using communication networks which are based on packet data transmission, such as the Internet.

Voice over IP may include:

Analog-to-digital conversion of the audio data to be transmitted as it is done in every digital transmission of speech data such as for example ISDN (integrated service digital network). Typically, digital samples of analog speech data, or generally audio data, for example generated by a microphone, are periodically generated.

Grouping digital samples which have been generated in certain time intervals to an audio data packet.

Compression of the audio data packet using an audio codec, for example AMR (adaptive multi-rate) to one or more codec packets.

Adding data for the real time transmission via packet data networks to the codec packets for example according to the real-time transport protocol (RTP) to generate RTP packets.

Transmission of the RTP packets via a packet based on communication system for example according to the protocols UDP (User Datagram Protocol) and IP (Internet Protocol).

Typically, the codec AMR and the protocol stack RTP/UDP/IP are used for the voice over IP communication service wherein according to the AMR codec the digital samples of audio data of a time interval of 20 ms are compressed to a codec packet. A time interval of 20 ms is also used for the compression according to other codecs. The RTP protocol is an end-to-end protocol, i.e. the two communication terminals, for example the voice over IP client 104 and the mobile terminals 105, 109 communicate using the RTP protocol. Functions provided by the RTP protocol for the transmission of audio data (or generally multimedia data) are the re-establishment of the timing of the received audio data, the media synchronisation, the error detection and error correction, the identification of contents and sources and the reception quality feedback.

For the transmission according to RTP the audio data are supplemented with an RTP control data header including a time stamp, source identification, features and redundancy information (among others).

The RTP protocol is accompanied by the control protocol RTCP (real-time transport control protocol) which allows the periodic reporting of quality of service, participant identification, source identification and synchronisation information between the communication terminals communicating according to RTP. RTCP packets are exchanged between the communication terminals periodically, wherein between the exchanges of two consecutive RTCP packets there lies a time interval having a length of some seconds. Typically, for each RTP packet stream there is an individual RTCP packet stream. The association of a RTP packet stream and a RTCP packet stream can be determined by the receiving communication terminal according to the UDP addressing because the port number of the RTCP packet stream is greater by one than the port number of the RTP packet stream.

According to the RTCP protocol so called sender reports (SR) or receiver reports (RR) may be exchanged. In a receiver report, among others, the following data may be included:

A time stamp of the last sender report received (LSR).
Delay since the last sender report has been received (DLSR).

Using the LSR and the DLSR and using time measurements a communication terminal receiving a receiver report can, using additions and subtractions, calculate the round trip time, i.e. calculate the time between the sending of an RTP packet by one of the two communicating communication terminals and the reception of the response to the RTP packet sent by the other communication terminal. The RTT does not include the delay caused by the decoding of the audio data and digital-to-analog conversion.

In a real time audio communication, for example in a bidirectional telephone call between two participants, there is a limit for the round trip time which should not be exceeded to keep the delay in a range that is not considered as being disturbing by the communication participants. A typical limit for the round trip time including the decoding of the audio data and the digital-to-analog conversion is for example 300 ms.

Basically, various methods are used in data transmission systems to distribute the communication resources for sending data and the communication resources for receiving data that are available in the system among the users of the transmission system and for distributing data to be transmitted by a user to the communication resources allocated to the user. Typically, it is desired in such communication systems (i.e. data transmission systems) to transmit the data to be transmitted, possibly in an order according to their priority, via the available communication resources as efficient as possible. The efficiency of a data transmission is for example characterized by the following parameters:

Time of transmission, data rate, transmission delay;
Interference of the data transmission, for example interference in a radio cell used for the data transmission or in other cells caused by the data transmission;
Amount of communication resources used for the data transmission;

Energy consumption, which is for example relevant for mobile communication terminals.

Since the optimization of individual parameters describing the efficiency of a data transmission typically has an impact on other parameters describing the efficiency of the data transmission there are various methods for setting a plurality of parameters describing the efficiency of a data transmission such that there is an optimum (in a certain sense) for the overall system, for example for the whole communication system, e.g. the whole mobile communication system.

Such a method is the discontinuous data transmission (DTx). According to discontinuous data transmission it may be the case that a communication terminal does not send data although there would be data to be sent. This may have an impact on all the parameters mentioned above describing the efficiency of a data transmission.

One can make the observation that the energy consumption of the transmission circuit of a communication terminal more strongly increases with the time in which the transmission circuit sends data than with the data rate of the data transmission. This means that from the point of view of the communication terminal it may be desirable with regard to the energy consumption to send data in a short time (i.e. in a burst) instead of distributing the transmission of the data over a longer time period.

In mobile communication systems based on CDMA such as for example UMTS communication systems the users of the mobile communication system share the power of the communication system, i.e. the overall power of the signals that are (wirelessly) transmitted. For an efficient operation of the communication system an exact setting of the transmission power of each transmitter may be desired. According to UMTS, the base stations 106, 110 and the mobile terminals 105, 109 therefore, when there are in $CELL_{13}DCH$ state, according to which they transmit data using dedicated channels allocated to them, continuously exchange power control data (power control commands, PC commands). According to UMTS, in each time slot power control data are transmitted for the power efficient maintaining of the corresponding physical communication connection. Since time slots are typically relatively short, e.g. have a length of 0.67 ms in UMTS, a communication terminal sends power control data in short distances and may therefore not switch off its transmitter (transmitting circuit) for a longer time for saving power and thus increasing the battery life-span. This is also the case when the communication terminal has no useful data to send as long as it is in CELL_DCH state.

An improvement with regard to the power saving operation in CELL_DCH state may be achieved using the CPC (continuous packet connectivity) feature in UMTS according to which a communication terminal which may temporarily not have useful data to send, i.e. which does not have to send useful data continuously (permanently), is switched in a state in which it sends useful data and power control data discontinuously for example in a transmission period including three time slots in every radio frame of 15 time slots. This may lead to energy savings in the communication terminal and to a reduction of the radio cell interference caused by the communication terminal. Therefore, a higher number of communication terminals in a radio cell may be in CELL-DCH state without increasing the radio cell interference above its maximum limit.

The discontinuous operation allows the communication terminal to switch off its transmitter, for example 8 ms of every 10 ms. This mode of operation is intended to be used during time periods in which the communication terminal has no or few useful data to send via the air interface, i.e. the radio communication interface between the mobile terminal 105, 109 and the base station 106, 110. The mode of operation is not intended to be used when there are higher amounts of data according to the CPC feature in UMTS.

In a mobile communication system based on FDMA (frequency division multiple access) or OFDMA (orthogonal FDMA) the users of the mobile communication system share the frequency band width available for the mobile communication system. For the efficient operation of the mobile communication system an exact frequency synchronisation is therefore more important than the control of the transmission power. Therefore, typically, the power control commands are sent less frequently as in mobile communication systems based on CDMA and the mobile communication system may have higher benefit from methods that allow the reduction of the number of transmission periods since the transmitters may be switched off for longer time periods.

In a mobile communication system according to UMTS long term evolution (LTE) which is based on OFDMA and SC-FDMA (single carrier FDMA) two alternative methods are provided for distributing data to be transmitted in uplink, i.e. from a mobile terminal 105, 109 to a base station 106, 110, to available communication resources. These methods are called semi-persistant scheduling and dynamic scheduling.

According to dynamic scheduling, a communication terminal sends for each block of data that it wants to send within the next transmission interval (transmission time interval, TTI) a communication resource request to the radio access network and waits for response with which it is signalled whether communication resources are allocated to the communication terminal which may be used by the communication terminal for the data transmission.

In semi-persistant scheduling communication resources are allocated to the communication terminal for each TTI without the communication terminal having to request communication resources. The communication resources are fixed to a certain sub-frame of a transmission interval. Only these communication resources may be used for data transmission unless other communication resources in the transmission interval have been allocated to the communication terminal according to dynamic scheduling. Semi-persistant scheduling is of an advantage for the transmission of voice over IP data due to the fact that according to the voice over IP communication service, small amounts of data are to be transmitted periodically, e.g. at regular time intervals. The allocation of communication resources to a mobile terminal 105, 109 for transmission of audio data in course of the usage of a voice over IP communication is illustrated in FIG. 2.

FIG. 2 shows a sub-frame diagram 200 according to an embodiment.

In the sub-frame diagram 200 sub-frames 201 of a first time transmission interval 202, a second time transmission interval 203 and a third time transmission interval 204 are shown.

In this example, allocated sub-frames 205 have been allocated to the mobile terminal 105, 109 for data transmission according to semi-persistant scheduling. In this example, in each time transmission interval 202, 203, 204 there are in this example two allocated sub-frames 205 which allow the mobile terminal 105, 109 to transmit a speech data packet.

The allocated sub-frames 205 are used by the mobile terminal 105, 109 to transmit the speech data packets to be transmitted in course of the usage of the voice over IP communication service. Communication resources may also be allocated for transmission time intervals with a different length than 20 ms. According to semi-persistent scheduling the dynamical adoption of the length of the time interval between two consecutive transmission periods, i.e. the time interval between the allocated sub-frames 205 in the first time transmission interval 202 and the allocated sub-frames 205 in the second time transmission interval 203 or between the allocated sub-frames 205 in the second time transmission interval 203 and the allocated sub-frames in the third time transmission interval 204, is not provided.

Independent from the scheduling method used the data supplied by higher layers to, for example, the RLC layer are stored in buffer memories from which they are read when they are transmitted. As long as not enough communication resources are available for the transmission or the available communication resources are used for data having higher priority than the buffered data the data are kept in the buffer memory. The MAC layer decides depending on the allocated communication resources and the data stored in the various buffer memories (for example one buffer memory for each priority) and the priorities of the buffered data from which buffer data is read and how much data is read from a buffer and supplied to the physical layer to be sent via the air interface. The buffer memories are for example part of the radio link control (RLC) protocol layer.

A method for transmitting data according to one embodiment is described in the following with reference to FIG. 3.

FIG. 3 shows a flow diagram 300 according to an embodiment.

In 301, a transmission mode is selected from at least a first transmission mode and a second transmission mode wherein according to the first transmission mode data is transmitted in at least two first time periods using first communication resources wherein the at least two first time periods are separated by a first time interval, wherein according to the second transmission mode data is transmitted in at least two second time periods using second communication resources wherein the at least two second time periods are separated by second time interval, and wherein the first time interval is longer than the second time interval and the first communication resources allow the transmission of a higher amount of data in one of the first time periods and the second communication resources in one of the second time periods.

In 302, data is transmitted according to the selected transmission mode.

In one embodiment, a communication device, for example a mobile terminal 105, 109, selects whether to use a first transmission mode according to which more communication resources, i.e. allowing the transmission of more data, are allocated but the time distance between two consecutive transmission periods is longer and a second transmission mode according to which less communication resources, i.e. allowing the transmission of less data, are allocated but the time distance between two consecutive transmission periods is shorter.

In one embodiment, the overall transmission delay, for example in the form of the round trip time, of the data transmission between two communications terminals is measured and based on the measurement value the length of the time interval during which data to be sent is buffer-stored, for example in a memory of the RLC layer in a communication terminal, is set. After the time interval during which data to be sent is to be stored and not to be sent has elapsed, the buffer-stored data are sent in one transmission burst. As a measure of the overall transmission delay, the round trip time or a similar parameter, generally a parameter which is characteristic for the time between the generation of media data to be sent, for example the recording of speech data or video data, and the reception of the media data corresponding to the response to the recorded media data, i.e. a parameter characteristic for the time delay that two users experience when they are communicating using the communication connection via which the media data is transmitted, may be used. The measurement of the parameter is possible on any layer in which there is a direct communication connection of the two communication terminals. For example, the round trip time may be calculated as such a parameter from the information included in the receiver reports according to the RTP protocol as described above.

In one embodiment, the method described with reference to FIG. 3 is used for the voice over IP communication service or another communication service which has similar properties with regard to the regularity according to which data is to be transmitted and the amount of the data to be transmitted. When the first transmission mode is selected, for example because the transmission delay allows the selection of the first transmission mode, the transmitter may be switched off for, compared to the second transmission mode, longer time intervals and energy may be saved which is for example of importance for mobile communication devices such as mobile terminals 105, 109.

Illustratively, according to the first transmission mode the efficiency of the data transmission with regard to the power consumption may be increased by collecting and buffer-storing data and the less frequent sending of data using more communication resources, e.g. higher data rates during the transmission time periods or longer transmission time periods, i.e. more time slots per transmission time periods.

The first communication resources, the first time interval, the second communication resources, and the second time interval may be set in such a way that the average data rate in the first transmission mode and the second transmission mode is the same such that there is no negative impact on the data rate when the first transmission mode is selected. This means that the first transmission mode allows the communication terminal to switch off its sender for a longer time interval than it is possible in the second transmission mode. To compensate for the less frequent data transmission according to the first transmission mode, more communication resources, e.g. a higher data rate, are used during the first time periods than during the second time periods. The possibility to send more data using the first communication resources in one of the first time periods than using the second communication resources in one of the second time periods may be achieved by selecting the first time periods to be longer than the second time periods or by selecting the first communication resources to allow higher data rates than the second communication resources, for example by defining the first communication resources to include the usage of a larger frequency range than according to the second communication resources, the usage of more CDMA spreading code sequences than according to the second communication resources, or the usage of more time-frequency-communication-resource blocks than according to the second communication resources.

Since the energy consumption of a transmitter increases less with the data-rate than with the duration of the transmission, energy may be saved when the first transmission mode is used and the first communication resources allows a higher data rate than the second communication resources.

An example for the application of the method illustrated in FIG. 3 would be that a communication terminal does not transmit every 20 ms in each transmission time interval 202, 203, 204 one voice over IP data packet as illustrated in FIG. 2 (this would be the second transmission mode), but transmits in every fourth transmission time interval 202, 203, 204, i.e. once in a time interval of 80 ms, four voice over IP data packets using four times the normal data rate (this would be the first transmission mode).

Since the first time interval is longer than the second time interval the transmission delay in the first transmission mode is higher than in the second transmission mode. In the example above the first voice over IP packet i.e. the voice over IP packet that would have to be transmitted first has (at maximum) an additional delay of 60 ms compared to the second transmission mode. Therefore, in one embodiment, the communication connection via which the data is transmitted between the two communication terminals has to be taken into account with regard to its performance, i.e. with regard to its transmission delay such that for example the round trip time is not above the limit acceptable for the users when the first transmission mode is selected.

In one embodiment, the selection of the first transmission mode is carried out only if there is a certain reserve between the time delay that occurs in the first transmission mode (or that is expected to occur) and the limit acceptable to the users. This reserve is taken into account due to the fact that there may be a high number of links between a high number of communication network elements between the communication terminals and thus there may be frequent and strong changes in the properties of the communication connection. This means that in one embodiment the selection of the transmission mode is done sub-optimally such that the users do not experience quality losses.

In one embodiment, the first communication resources allow a higher data rate than the second communication resources. Alternatively or additionally, the first time periods are longer than the second time periods. For example, each of the first time periods is longer than each of the second time periods, or the first time periods are taken together longer than the second time periods taken together.

The data is for example to be transmitted from a first communication device to a second communication device.

In one embodiment, the method further includes determining a parameter value describing the transmission delay between the first communication device and the second communication device when transmitting data according to the first transmission mode or the second transmission mode and the transmission mode is selected based on the parameter value. For example, the parameter value may be the round trip time between the first communication device and the second communication device. In one embodiment, the method further includes determining a parameter value describing the transmission delay between the first communication device and a communication network component involved in the data transmission between the first communication device and the second communication device.

The data is for example transmitted using a mobile communication network.

In one embodiment, the data is media data generated in accordance with a communication service. For example, the communication service is a speech communication service, e.g. a packet based communication service such as Voice over Internet Protocol (VoIP).

In one embodiment, the data is transmitted using a communication connection and the method further includes determining a quality requirement for the communication connection and wherein the transmission mode is selected based on the determined quality requirement.

The quality requirement could be a requirement with respect to the maximum end-to-end delay of the communication connection (e.g. the maximum round trip time) or also the maximum delay between two network components involved in the communication connection, between one of the communication devices and a network component involved in the communication connection, or between the two communication devices communicating using the communication connection.

The method may further include receiving a message including a specification which transmission mode is to be used for transmitting the data and selecting the transmission mode according to the message.

In one embodiment, the method further includes generating and sending a message including a specification which transmission mode has been selected.

For example, the method further includes requesting communication resources according to the selected transmission mode.

The data is for example transmitted using a transmitting circuit and the method may further include switching off the transmitting circuit at least partially during the first time interval.

According to one embodiment, a method of transmitting data is provided including deciding, for each of a plurality of time periods in which radio resources are allocated to a communication device, whether the time period should be used by the communication device for sending data; and transmitting the data in the time periods for which it has been decided that the time periods should be used for sending the data.

The method described with reference to FIG. 3 is for example carried out by a communication device, for example a mobile terminal, as shown in FIG. 4.

FIG. 4 shows a communication device 400.

The communication device 400 may include a selecting circuit 401 which is configured to select a transmission mode from at least the first transmission mode and the second transmission mode, wherein according to the first transmission mode data is transmitted in at least two first time periods using first communication resources wherein the at least two first time periods are separated by a first time interval, wherein according to the second transmission mode data is transmitted in at least two second time periods using second communication resources wherein the at least two second time periods are separated by a second time interval, and wherein the first time interval is longer than the second time interval and the first communication resources allow the transmission of a higher amount of data in one of the first time periods and the second communication resources in one of the second time periods.

The communication device 400 may further include a transmitting circuit 402 that is configured to transmit data according to the selected transmission mode.

A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment.

An example of an embodiment where the communication device, in this example the first mobile terminal 105, carries out measurement of the round trip time is explained. It is assumed that in accordance with the speech data coding a speech data packet to be transmitted is generated in each time interval of length T. This means that the time intervals between the occurrence of two data package to be transmitted have a length of T. At the beginning, it is assumed that the transmission of the speech data packets is carried out such that in each time interval of length T one data speech packet is transmitted. This transmission mode is denoted as transmission mode "T" in the following. With the designations used in the description of FIG. 3 this would be the second transmission mode.

After some time, the round trip time is measured in the RTCP protocol layer. The measured value of the round trip time may be compared with a threshold value (e.g. named RTT-Max) for the round trip time or a desired value (e.g. a RTT should-be value) for the round trip time. Based on the result of this comparison it can be determined whether the quality of service would also be sufficient when data packets are not transmitted in each time interval of length T but are only transmitted in every second time interval of length T, i.e. only once in a time interval of length 2T. It is assumed that this is the case and that the transmission mode is set to transmission mode "2T" (this would be the first transmission mode), i.e. in a time interval of length 2T there is only one transmission period in which two speech data packets are transmitted. The transmission period could be twice as long as the transmission period according to transmission mode "T" or the data rate could be twice the data rate used according to transmission mode "T".

During transmission mode "2T" the round trip time is continuously measured. When there are measurement results from which it is determined that the desired quality of service can no longer be guaranteed the transmission mode is switched back from transmission mode "2T" to transmission mode "T". In one embodiment, this switching may be carried out as fast as it is possible according to the communication network used.

In one embodiment, there are further transmission modes according to which the data speech packets are even buffered longer, i.e. data speech packets are transmitted in transmission periods which only occur once in a time interval of length 3T, of length 4T, etc. Generally, in transmission mode "nT" transmission periods only occur once in a time interval of length nT. When transmission mode "2T" is used (generally transmission mode "nT") and the measurements of the round trip time show that a transmission mode with less frequent transmissions, e.g. transmission mode "3T" (generally transmission mode "n+1T") may be used. This, according to one embodiment, may only be done after a certain duration T_wait after the last change of the transmission mode. The duration T_wait is for example selected such that changes which might be carried out by the communication partner, i.e. the other communication terminal, of the transmission mode have been incorporated in the last measurement. For example the duration T_wait is selected as two times the round trip time.

In one embodiment a transmission mode is not necessarily switched to its neighboring transmission mode, i.e. transmission mode "nT" is not necessarily switched into transmission mode "n−1T" or transmission mode "n+1T", but in case of a step up the transmission mode "nT" may be switched to transmission mode "n+2T" or "n+3T" and in case of a step down the transmission mode switches to, for example, transmission mode "n−3T". In one embodiment, in case of a step down, the transmission mode always switches to transmission mode "T", i.e. a reset is carried out in case that it is determined that the desired quality of service can no longer be guaranteed.

Various threshold values may be defined for comparison with the measured round trip time. For example a maximum round trip time value which, when exceeded, gives rise to a step down of the transmission mode, i.e. more frequent transmission periods, a round trip time SOS value which, when exceeded, gives rise to a switching into transmission mode "T" and a minimum round trip time value which, when the measured round trip time is below this value, gives rise to a step up of the transmission mode, i.e. to more frequent transmission periods, may be defined.

In transmission mode "nT" with n greater than one in some time transmission intervals radio resources are not used but in other time transmission intervals more radio resources are used than in transmission mode "T". Therefore, in one embodiment, the communication terminal signals to the communication network which provides the communication connection via which the data speech packets are transmitted, what the transmission requirements currently are, e.g. which transmission mode is currently used. In one embodiment, the communication network should agree to a change of transmission mode and they may reject the request for a change of transmission mode.

In the following, an example is described where the communication network is a mobile communication network according to UMTS LTE as illustrated in FIG. 1 and the communication terminal is the first mobile terminal 105 according to UMTS LTE which has a voice over IP communication connection to another communication terminal which may be the VoIP client 104 or the second mobile terminal 109. For the transmission of the speech data AMR over RTP/UDP/IP over LTE is used. The transmission time interval has in this example a length of 20 ms. However, other lengths of transmission time intervals are also possible. In the following, the following values for the above parameters are set:

| | |
|---|---|
| RTT-Min (minimum RTT value): | 150 ms |
| RTT-Max (maximum RTT value): | 210 ms |
| RTT-SOS: | 250 ms |
| T_wait: | 400 ms |

These parameters are for example set before the communication connection to the other communication terminal is established or shortly after the establishment of the communication connection. It is further possible that these parameters are preset in the communication terminal or that they are negotiated during the establishment of the communication connection between the two communication terminals or the communication terminal and the communication network. This negotiation is for example an end-to-end negotiation taking into account the elements of the communication network involved in the communication connection and for example takes place on the layer of the RTP protocol, of the session initiation protocol (SIP) (as RTP; possibly via various elements of the IMS sub-networks 102, 103), of the session management protocol (in cellular core networks), of the radio resource protocol (within the cellular radio access network) or the MAC (in the radio access network) or based on another protocol used for the communication between the communication terminal and a network element involved in the communication connection or the other communication terminal.

It is assumed that the communication connection has been successfully established and that according to semi-static scheduling communication resources are allocated to the communication terminal for data transmission in uplink which allow the transmission of a voice over IP packet in each transmission time interval, i.e. once per 20 ms.

In the RTCP layer the round trip time is measured. In this example it is assumed that the measurement of the round trip time gives the value of 60 ms for the round trip time. A comparison with the definition of the parameters above shows that the transmission mode may be changed to 40 ms, i.e. to a transmission mode where there is only one transmission period per time interval of 40 ms. This is illustrated in FIG. 5.

FIG. 5 shows a sub-frame diagram 500 according to an embodiment.

Sub-frames 501 of a first time interval 502 corresponding to one time transmission interval and of a second time interval 503 corresponding to two time transmission intervals are shown. In the first time interval allocated sub-frames 504 are allocated to the communication terminal for uplink data transmission of the speech packets during a first time period 505 and in the second time interval 503 allocated sub-frames 504 are allocated for uplink data transmission by the communication terminal during a second time period 506.

The allocated sub-frames 504 during the first time interval 502 are allocated to the communication terminal according to the 20 ms transmission mode, i.e. one transmission period per time interval of 20 ms and the allocated sub-frames 504 during the second time interval are allocated to the communication terminal according to the 40 ms transmission mode, i.e. one transmission time period per 40 ms time interval. According to the result of the comparison of the measured round trip time with the parameter values defined, the communication terminal intends to switch from the 20 ms transmission mode to the 40 ms transmission mode at the end of the first time interval 502, i.e. at a certain switching time 507.

When the communication terminal has decided that the transmission mode should be switched, a MAC control element is added to the next MAC protocol data unit (MAC-PDU) which is sent (and which may also include a voice over IP data packet) which signals to the base station 106 the transmission mode which should from now on be used.

The communication network acknowledges this uplink MAC-PDU with the downlink MAC-PDU which may include an explicit acknowledgement of the change of the transmission mode or an implicit acknowledgement of the change of the transmission mode and which may also include a specification of the new communication resource allocation, in this example the communication resources allocated to the communication terminal for uplink transmission of speech data during the second time period 506 which allow the transmission of twice the amount of data than the communication resources used by the communication terminal during the first time period 505.

The allocation of radio resources may also have been configured at another time for example in the form of a pre-defined configuration for each transmission mode or may be determined according to a pre-defined rule from the communication resource allocation for the previous mode, in this example the 20 ms transmission mode. In this case, the explicit signalling of the communication resources allocated for the following transmission mode, in this example the 40 ms transmission mode, would not be necessary.

The communication terminal buffers all data packets generated by the audio codec and the various protocol layers (RTP etc.) and transmits them using the allocation of communication resources for the 40 ms transmission mode in one time period 506 per time interval 503 of length 40 ms. The scheduling and the transmission of data in the MAC layer may for example be carried out in a conventional manner. However, according to the new communication resource allocation once per time interval 503 of 40 ms the data are buffer-stored and less frequently transmitted. The switching time 507 is for example stored in the form of a parameter T_new for later use.

In one embodiment, the communication terminal autonomously decides which transmission mode it uses and does not inform the communication network about this decision. This is illustrated in FIG. 6.

FIG. 6 shows a sub-frame diagram 600 according to an embodiment.

The sub-frame diagram 600 shows sub-frames 601 of a first time interval 602 and second time interval 603. During a first time period 604 in the first time interval 602 allocated sub-frames 605 are allocated to the communication terminal for uplink transmission of a speech data during the second time interval 603 allocated sub-frames 605 are allocated to the communication terminal during a second time period 606 and a third time period 607 of the second time interval 603. The allocated sub-frames 605 allocated to the communication terminal for uplink transmission of speech data during the first time period 604, the second time period 606, and the third time period 607 are allocated to the communication terminal according to the communication resource allocation of the 20 ms transmission mode, i.e. they are allocated according to one time period 604, 606, 607 per time interval 602 of length 20 ms. At a switching time 608 the communication terminal switches from the 20 ms transmission mode to the 40 ms transmission mode. Since the communication network is not informed about this change of transmission mode in this embodiment the communication resources allocated to the communication terminal during the second time period 606 and the third time period 607 continue to be allocated to the communication terminal.

However, since the 40 ms transmission mode is to be used the MAC layer of the communication terminal only transmits speech data packets once per time interval 603 of length 40 ms. This means that the communication terminal does not use the communication resources allocated to it in the second time period 606 and the third time period 607 but explicitly requests communication resources for a single data transmission in a time interval 603 of length 40 ms, in this example in the first transmission time interval of the second time interval 603. These communication resources are for example requested according to dynamic scheduling. In this example, it is assumed that the communication resources allocated for a fourth time period 609 allow the transmission of two voice over IP data packets during the fourth time period 608 in contrast to the communication resources allocated to the communication terminal in the fist time period 604, second time period 606 and third time period 607 which only allow transmission of one voice over IP data packet in the respective time periods 604, 606, 607.

In this embodiment, power may be saved since data transmissions occur less frequently. However, the communication resources allocated to the communication terminal in the second time period 606 and the third time period 607 are wasted since the communication has no knowledge about the transmission mode and can therefore not re-allocate the communication resources to another communication terminal.

In one embodiment, the communication terminal informs the communication network about the change of the transmission mode and the communication resources allocated to the communication terminal in the second time period 606 and the third time period 607 are released and re-allocated to other communication terminals. This means that when the communication terminal switches from the 20 ms transmission mode to the 40 ms transmission mode it also switches to dynamic scheduling.

The signalling between the communication terminal and the communication network with regard to the transmission mode may be carried out in the MAC layer using control data elements in MAC data PDUs or using special MAC control PDUs. Also, another protocol may be used for the signalling with regard to the transmission mode. For example, it may be carried out using the control data signalling in the physical layer or in the RLC layer or the RRC layer.

In one embodiment, the communication terminal signals the measured parameter, for example the measured round trip time, or a value derived from the result of the measurement and the communication network decides whether the transmission mode is changed. The result of this decision may be signalled from the communication network to the communication terminal similarly as in case that the communication terminal selects the transmission mode and signals the result of the selection to the communication network.

After the communication terminal has switched to the 40 ms transmission mode it is (as an example) assumed that a new RTT measurement has the result 80 ms for the round trip time. When the time of the measurement is less than T_wait after the switching time 608 this measurement has no effect with regard to the selected transmission mode. Only if the measurement time is at least T_wait after the switching time 608 there may be another change of the transmission mode, for example to a 80 ms transmission mode in which there is only one time period for transmission per time interval of length 80 ms. By using the time value T_wait and thus only allowing change of the transmission mode after the time given by T_wait it is assured that for example settings which are carried out by the other communication terminal for example based on its own RTT measurements are incorporated in a measurement result that gives rise to a transmission mode change. In other words the parameter T_wait ensures that the controlling system including the measurement of the round trip time and the selecting of the transmission mode reacts with a certain tardiness or delay such that oscillating, i.e. permanent switching between two transmission modes is avoided. When the RTT is based on the RTCP the measurement time will usually be more than T_wait after the switching time because RTCP packets are only exchanged every one or more seconds.

The measurement of the parameter describing the transmission delay, the selecting after transmission mode and the buffering of the data packets etc. may take place in various layers. The layers of the communication system according to one embodiment are illustrated in FIG. 7.

FIG. 7 shows a communication arrangement 700 from the view of the protocol stack according to an embodiment.

The communication arrangement 700 includes first mobile terminal 701 corresponding to the first mobile terminal 105, a base station 702 corresponding to the first base station 106 in FIG. 1, and a plurality of IP-Hops 703 which refer to the network elements used in the packet based communication between the first mobile terminal and a second mobile terminal 704, for example routers or switches of the core network of the communication system 100.

The first communication terminal 701 includes first physical layer components 703, first MAC layer components 704, first RLC (radio link control) layer components 705, first PDCP (packet data convergence protocol) layer components 706, first IP layer components 707, first UDP layer components 708, first RTP layer components 709 and first AMR layer components 710. The first communication terminal 701 further includes RRC (radio resource control) layer components 711, NAS (non access stratum) components 712 and IMS/SIP components 713, which are in this example not involved in the actual transmission of the media data but only in the signalling.

The base station 702 includes second physical layer components 714, second MAC layer components 715, second RLC layer components 716 and second PDCP layer components 717. The plurality of IP-Hops 703 includes third IP layer components 718. The second communication terminal 704 which is for example the second mobile terminal 109 or the voice over IP client 104 includes second IP layer components 719, second UDP layer components 720, second RTP layer components 721 and second AMR layer components 722.

For example, as explained above, the round trip time is determined based on messages exchanged between the components of the RTP layer components 709, 721 of the first communication terminal 701 and the second communication terminal 704. The first RTP layer components 709 or the components of the application layer of the first communication terminal 701, in this example the AMR layer components 710 may determine whether an additional transmission delay is acceptable and the transmission mode may be changed such that data packets are transmitted less frequently. If it is determined that the transmission mode may be switched to a transmission mode according to which data packets are transmitted less frequently the command to switch the transmission mode is for example sent to a scheduling circuit being part of the first MAC layer components 704 of the first communication terminal 701. In this case, the decision for a transmission mode change lies in the RTP layer or in the application layer.

In another embodiment, data which allows the determination of the transmission delay is supplied to the components of the first MAC layer components 704 such that the first MAC layer components 704 determine the transmission delay and decide whether the transmission mode should be changed. In this case, the decision lies in the MAC layer.

In another embodiment, a different circuit or component is provided which receives the measurement data and carries out the decision.

The tasks to be performed during the procedure including the measurement of the transmission delay the decision and the switching off the transmission mode may be distributed among components of any layers. Further, there are various possibilities for the implementation of the corresponding functionalities.

By grouping a plurality of voice over IP data packets such that there are together transmitted in the same time period allows a reduction of the number of time periods used for transmission. However, as explained above, this introduces additional delay. In one embodiment therefore, as explained, an end-to-end measurement, for example of the round trip time, i.e. a measurement of the end-to-end transmission delay between the two participating communication terminals is used as a basis for controlling the selection of the transmission mode, i.e. for example controlling the MAC scheduling. In another embodiment the end-to-end transmission delay is not measured directly but a transmission delay between one of the participating communication terminals and a network component. Nevertheless, the transmission delay between the participating communication terminal and the network component gives good indication of the overall transmission delay. In this regard, the parameter to be measured on which the selection of the transmission mode is based may be any parameter that is correlated with the overall transmission delay between the two participating communication terminals.

The change of the transmission mode may be seen as an extension of the semi-persistant scheduling according to LTE by the possibility to change the length of the time intervals that lie between the transmission periods. This may be achieved with relatively low signalling effort by, for example, only signalling a change of the transmission mode. Communication resources may be allocated according to the length of the time intervals between the transmission time periods for example according to pre-determined rules.

When the communication terminal switches to transmission modes where the transmission time periods are further apart as long as this is allowed by the acceptable delay the communication terminal may switch off its transmitter for longer time periods, for example switch off a base band controlling circuit, a radio frequency circuit or a power amplifier which leads to reduced power consumption and thus increases the time until, in case of a mobile communication terminal, the battery has to be recharged. In a transmission mode where the transmission time periods are further apart more data has to be transmitted in each transmission time period. For example, this is done using a larger band width (generally higher data rate) for the data transmission. Since the energy consumption of the transmitter components are much more dependent on the active time of the transmitter than on the data rate used for the transmission power can be saved when the transmission mode is changed to a transmission mode with fewer transmission time periods. The usage of a higher data rate during the transmission time periods may reduce the number of users that may communicate during the transmission time periods. However, these transmission time periods occur less frequently as in a transmission mode where the transmission time periods occur with shorter time distances.

For example the NB-AMR (narrow band adaptive multirate) codec generates encoded speech data at a data rate of 4.75 kbps to 12.2 kbps. If it is acceptable that the round trip time increases by up to 20 ms then three audio samples can be accumulated before they are sent together in one data burst. In worst case, this would be 732 bits.

At a transfer speed of 384 kbps this amount of data could be sent in 2 ms. Therefore, the transmitter, e.g. radio frequency module and the power amplifier if only is to be activated for 2 ms every 60 ms.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A method of transmitting data comprising
  selecting a transmission mode from at least a first transmission mode and a second transmission mode, wherein according to the first transmission mode data is transmitted in at least two first time periods using first com- munication resources wherein the at least two first time periods are separated by a first time interval, wherein according to the second transmission mode data is transmitted in at least two second time periods using second communication resources wherein the at least two second time periods are separated by a second time interval, and wherein the first time interval is longer than the second time interval and the first communication resources allow the transmission of a higher amount of data in one of the first time periods than the second communication resources in one of the second time periods; and transmitting data according to the selected transmission mode, wherein the data is to be transmitted from a first communication device to a second communication device and wherein the method comprises determining a parameter value describing the transmission delay between the first communication device and the second communication device when transmitting data according to the first transmission mode or the second transmission mode or describing the transmission delay between the first communication device and a communication network component involved in the data transmission between the first communication device and the second communication device and selecting the transmission mode based on the parameter value.

2. The method of transmitting data according to claim 1, wherein the first communication resources are configured such that they allow a higher data rate than the second communication resources.

3. The method of transmitting data according to claim 1, wherein the first time periods are longer than the second time periods.

4. The method of transmitting data according to claim 1, wherein the parameter value is the round trip time between the first communication device and the second communication device.

5. The method of transmitting data according to claim 1, wherein the data is transmitted using a mobile communication network.

6. The method of transmitting data according to claim 1, wherein the data is media data generated in accordance with a communication service.

7. The method of transmitting data according to claim 6, wherein the communication service is a speech communication service.

8. The method of transmitting data according to claim 7, wherein the communication service is a packet based communication service.

9. The method of transmitting data according to claim 8, wherein the communication service is Voice over Internet Protocol.

10. The method of transmitting data according to claim 1, wherein the data is transmitted using a communication connection and the method further comprises determining a quality requirement for the communication connection and wherein the transmission mode is selected based on the determined quality requirement.

11. The method of transmitting data according to claim 1, further comprising receiving a message including a specification which transmission mode is to be used for transmitting the data and selecting the transmission mode according to the message.

12. The method of transmitting data according to claim 1, further comprising generating and sending a message including a specification which transmission mode has been selected.

13. The method of transmitting data according to claim 1, further comprising requesting communication resources according to the selected transmission mode.

14. The method of transmitting data according to claim 1, wherein the data is transmitted using a transmitting circuit and the method further comprises switching off the transmitting circuit at least partially during the first time interval.

15. A communication device comprising a selecting circuit configured to select a transmission mode from at least a first transmission mode and a second transmission mode, wherein according to the first transmission mode data is transmitted in at least two first time periods using first communication resources wherein the at least two first time periods are separated by a first time interval, wherein according to the second transmission mode data is transmitted in at least two second time periods using second communication resources wherein the at least two second time periods are separated by a second time interval, and wherein the first time interval is longer than the second time interval and the first communication resources allow the transmission of a higher amount of data in one of the first time periods than the second communication resources in one of the second time periods; and a transmitting circuit configured to transmit data according to the selected transmission mode wherein the data is to be transmitted from a first communication device to a second communication device and wherein the selecting circuit is configured to determine a parameter value describing the transmission delay between the first communication device and the second communication device when transmitting data according to the first transmission mode or the second transmission mode or describing the transmission delay between the first communication device and a communication network component involved in the data transmission between the first communication device and the second communication device and select the transmission mode based on the parameter value.

16. The communication device according to claim 15, wherein the communication device is a mobile communication terminal.

17. A communication device comprising selecting means for selecting a transmission mode from at least a first transmission mode and a second transmission mode, wherein according to the first transmission mode data is transmitted in at least two first time periods using first communication resources wherein the at least two first time periods are separated by a first time interval, wherein according to the second transmission mode data is transmitted in at least two second time periods using second communication resources wherein the at least two second time periods are separated by a second time interval, and wherein the first time interval is longer than the second time interval and the first communication resources allow the transmission of a higher amount of data in one of the first time periods than the second communication resources in one of the second time periods; and transmitting means for transmitting data according to the selected transmission mode wherein the data is to be transmitted communication device to a second communication device and wherein the selecting means are for determining a parameter value describing the transmission delay between the first communication device and the second communication device when transmitting data according to the first transmission mode or the second transmission mode or describing the transmission delay between the first communication device and a communication network component involved in the data transmission between the first communication device and the second communication device and selecting the transmission mode based on the parameter value.

* * * * *